(12) United States Patent
Schmidt et al.

(10) Patent No.: US 6,395,865 B2
(45) Date of Patent: May 28, 2002

(54) PROCESS FOR MAKING PEN/PET BLENDS AND TRANSPARENT ARTICLES THEREFROM

(75) Inventors: Steven L. Schmidt, Bedford; Brian Lynch; Amit S. Agrawal, both of Merrimack, all of NH (US)

(73) Assignee: Continental Pet Technologies INC, Toledo, OH (US)

( * ) Notice: Subject to any disclaimer, the term of this patent is extended or adjusted under 35 U.S.C. 154(b) by 0 days.

(21) Appl. No.: 09/791,361

(22) Filed: Feb. 23, 2001

Related U.S. Application Data

(63) Continuation of application No. 09/308,787, filed on Jul. 23, 1999, now Pat. No. 6,194,536, which is a continuation of application No. PCT/US97/22353, filed on Dec. 5, 1997.

(51) Int. Cl.[7] .............................................. C08G 63/02
(52) U.S. Cl. ....................................... 528/272; 528/271
(58) Field of Search .................................. 528/271, 272

(56) References Cited

U.S. PATENT DOCUMENTS 3,453,240 A * 7/1969 Plaster et al. ............... 528/176
4,360,661 A * 11/1982 Horlbeck et al. ........... 528/272

* cited by examiner

Primary Examiner—Terressa M. Boykin
(74) Attorney, Agent, or Firm—Finnegan, Henderson, Farabow, Garrett & Dunner L.L.P.

(57) ABSTRACT

Process for controlling the change of intrinsic viscosity and transesterification during solid stating of a polyethylene terephthalate (PET) and polyethylene naphthalate (PEN) blend, with an effective amount of an ethylene glycol compound. The process enables the production of a copolymer based on predefined initial and final IV's and final transesterification level, by varying the solid-stating time and/or effective amount of ethylene glycol. In one embodiment, a relatively greater amount of post-consumer PET (e.g., 70%) having an IV of on the order of 0.72–0.73, is incorporated in the blend to provide a final IV on the order of 0.80–0.85, and a moderate, controlled level of transesterification; the blend is used to injection mold a sleeve layer of a preform. In another embodiment, a substantially transparent neck finish for a preform is made from a PEN/PET blend having an amount of ethylene glycol which enables substantial transesterification, without excessive increase in IV.

23 Claims, 9 Drawing Sheets

PROCESS FOR MAKING PEN/PET BLENDS AND TRANSPARENT ARTICLES THEREFROM

CROSS-REFERENCE TO RELATED APPLICATIONS

This is a continuation application of U.S. application Ser. No. 09/308,787 filed Jul. 23, 1999 which is a continuation under 35 U.S.C. §371 of PCT Application US97/22353 filed Dec. 5, 1997, which claims priority to U.S. application Ser. No. 08/760,918 filed Dec. 6, 1996 now issued as U.S. Pat. No. 5,902,539.

FIELD OF THE INVENTION

The present invention concerns a process for making polyethylene naphthalate and polyethylene terephthalate blends, and more particularly to a method of controlling the change of intrinsic viscosity and level of transesterification during solid stating of such blends.

BACKGROUND OF THE INVENTION

Polyethylene naphthalate (PEN) has a significantly higher glass transition temperature ($T_g$) than polyethylene terephthalate (PET), i.e., about 120° C. compared to 80° C., as well as a five time improvement in oxygen barrier property. PEN is thus a desirable polymer for use in thermal-resistant beverage containers (e.g., hot-fillable, refillable and/or pasteurizable containers), and for packaging oxygen-sensitive products (e.g., beer, juice). However, PEN is more expensive (both as a material and in processing costs) than PET and, therefore, the improvement in properties must be balanced against the increased expense.

One method of achieving an article that is lower in cost than PEN, but with higher thermal and barrier properties, is to provide a blend of PEN and PET. However, blending of these two polymers often results in an opaque material with incompatible phases. Efforts to produce a clear container or film from a PEN/PET blend have been ongoing for over ten years, but there is still no commercial process in widespread use for producing such articles.

One suggested method for making substantially transparent PEN/PET blends is a solid-stating process which increases the level of transesterification (copolymerization) between the two polymers. For example, WO 92/02584 (Eastman) states that transesterification occurs when the melt blended, crystallized polymer is held at a temperature below the melting point and subjected to an inert gas flow in order to raise the inherent viscosity and/or remove acetaldehyde. This transesterification is in addition to that occurring during melt blending and molding operations. However, Eastman reports that when the level of transesterification between the two polymers is very high, the crystallinity and resultant physical properties of the blend are reduced to the point where they are undesirable for making oriented containers with good mechanical properties.

Eastman teaches the addition of a phosphorus stabilizer for controlling (reducing) the amount of transesterification which occurs during solid stating. In this way, Eastman claims to limit the amount of transesterification to an amount no greater than about 20%, based on a theoretical maximum amount of transesterification being equal to 100%. For example, in Table 2 Eastman describes the transesterification and inherent viscosity of various solid-stated PEN/PET blends, where the initial inherent viscosity of the blend was on the order of 0.55 to 0.65, and the final inherent viscosity was about 0.80 to 0.85. In a control example (50—50 PEN/PET) the final inherent viscosity was acceptable (0.86) after eight hours, but the percent transesterification (25.0) was too high (above 20%). By adding 0.5 or 1.0% Ultranox 626 (a phosphite stabilizer) in the first two examples, the Eastman process provided a final inherent viscosity of 0.80 to 0.84 after eight hours, and an acceptable percent transesterification of 17.0 or 19.0 (below 20%). The other three stabilizers/metal deactivators tested in Table 2 failed to provide the final desired inherent viscosity and transesterification levels.

Although the Eastman process may be suitable for certain limited starting materials and desired transesterification levels, it cannot be expanded generally to different combinations of intrinsic viscosity, solid-stating time, and levels of transesterification. For example, of potential interest is a blend made from precursor homopolymer PEN and post-consumer PET (PC-PET). The intrinsic viscosity of PC-PET is much higher than that of virgin fiber-grade PET, so that a blend of PEN/PC-PET would require a relatively larger amount of transesterification per unit intrinsic viscosity increase (compared to a blend of PEN/virgin PET). Hence, among other disadvantages, the prior art does not provide a process that allows a desired level of both intrinsic viscosity and transesterification level.

It is possible to make substantially transparent preforms (for blow molding into containers) with a PET/PEN blend, without solid stating, but the disadvantages are such that the process is not commercially viable. First, the preform injection molding temperature (i.e., barrel temperature) and/or the equilibration time (i.e., time in the barrel) must be increased such that the resulting process is not cost-efficient or sufficiently reproducible for a commercial process. For example, in certain cases, the barrel time would be increased by a factor of four (i.e., an increase over the standard cycle of 45 seconds of up to 180 seconds); as a result, one would probably not be able to run the process on a standard injection molding machine. Furthermore, the increase in barrel time/temperature increases the acetaldehyde (AA) levels in the preform to an unacceptably high level, such that AA is likely to be extracted into the food product and produce an off taste, particularly with a product such as bottled water. Thus, this has not proven to be the desired solution.

SUMMARY OF THE INVENTION

According to the present invention, a process is provided for controlling both the rate of change of intrinsic viscosity (IV) and the rate of transesterification of a blend of polyethylene terephthalate (PET) and polyethylene naphthalate (PEN) during solid stating. The method comprises providing PEN having a first intrinsic viscosity (IV), providing PET having a second IV, and reacting the PEN and PET in the presence of an ethylene glycol compound in an amount sufficient to achieve a desired final IV and final level of transesterification in the copolymerized PEN/PET product.

In one embodiment, a full-length preform sleeve layer is made from a PEN/PET blend having an effective amount of ethylene glycol to increase the $T_g$ at least about 15° C. Other layers of the preform body may be PET. In this embodiment, a moderate, controlled level of transesterification is provided to enable strain orientation/crystallization in both the blend and PET layers for optimizing the mechanical performance, while maintaining optical clarity (substantial transparency).

In another embodiment, the process is used for making container preforms having a neck finish with a transesterification level of at least about 30% or greater. For example, a 30% PEN and 70% PET weight percent blend includes an effective amount of ethylene glycol to obtain a desired high level of transesterification, but without raising the molecular weight (i.e., intrinsic viscosity) too high. This blend will provide a high $T_g$ neck finish portion and is also melt compatible with adjacent PET layers to maintain clarity and adhesion. Because the neck finish is not stretched, there is no need to provide a lower level of transesterification as would be required to enable strain orientation/crystallization.

In other embodiments, the method of this invention enables the use of initial higher molecular weight polymers. For example, it may be desirable to utilize post-consumer PET (PC-PET), having an initial IV of 0.72–0.73 dL/g, in an amount of from about 60–90 weight percent, with the remaining component being PEN. A predetermined final IV and transesterification level are achieved by adjusting the solid stating time and/or amount of ethylene glycol used.

The alkylene glycol preferably has up to 6 carbon atoms, more preferably 2 or 3 (propylene or ethylene), and more preferably 2 (ethylene). It may be precompounded with the PET and PEN, or added to the reaction chamber in which the PET and PEN are copolymerized. Preferred amounts of the alkylene glycol include at least 0.05 weight percent based on the total weight of PET and PEN, more preferably 0.1 to 2 weight percent, and most preferably 0.1 to 0.5 weight percent.

These and other features and advantages of the present invention are more particularly described with regard to the following detailed description and drawings.

DETAILED DESCRIPTION

Figure 1:
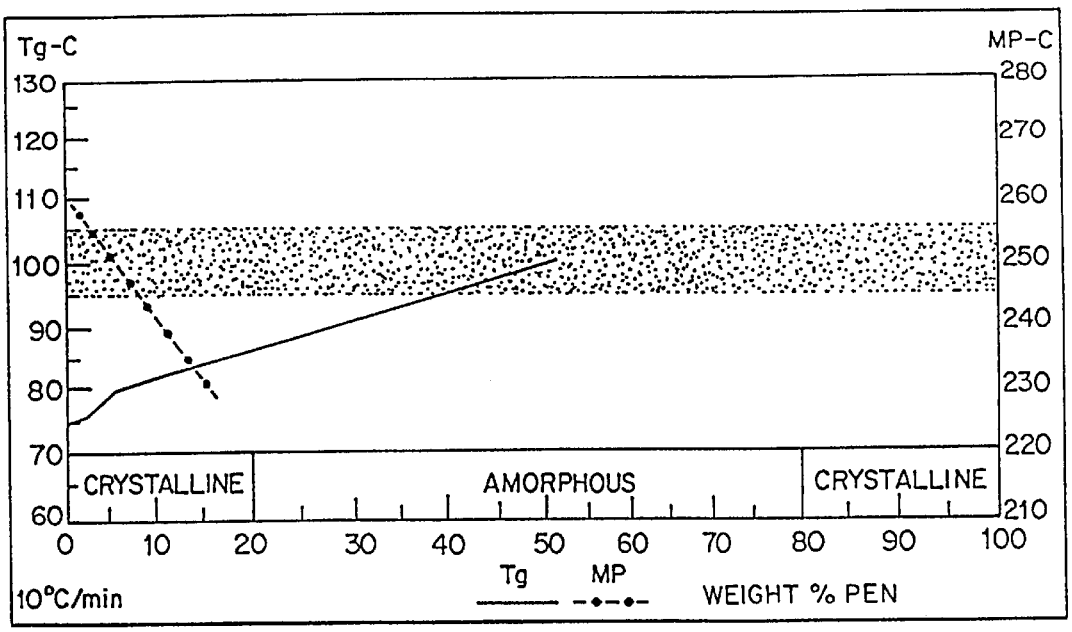
FIGS. 1–2 are graphs showing the change in melting temperature (MP) and orientation temperature ($T_g$) for various PEN/PET random copolymer compositions.

When PET/PEN blends are subjected to a solid-stating process, for example to increase the IV and/or to reduce acetaldehyde generation, the amount or level of transesterification is increased, based on a theoretical maximum amount of transesterification (random copolymerization) of 100%. Transesterification is measured by nuclear magnetic resonance spectroscopy (NMR)—more specifically by determining the relative area in the NMR curves of the ethylene protons associated with naphthalene-dicarboxylate-ethylene glycol-terephthalate units, compared to what would be found for a completely random copolymer made with naphthalenedicarboxylic acid, terephthalic acid, and ethylene glycol. The random copolymer would be considered to have 100% transesterification. See WO92/02584 (Eastman).

The PEN/PET blend may be formed by extrusion compounding, pelletizing, crystallizing and then solid stating to a desired transesterification level. Subsequently, it is contemplated that the solid-stated polymer will be extruded or injection molded to form a preform; this step is likely to produce a reduction in IV and increase in transesterification. Finally, the preform will be expanded (e.g., blow molded) into a substantially transparent container or other article.

There are three significant variables in the solid-stating process, namely the change in IV, the solid-stating time, and the change in transesterification level. Temperature is also important but is usually set to the highest temperature possible without melting the polymer blend. Generally, for a given application, the initial and final IV are specified, as well as the final level of transesterification. It would be desirable to control the process to achieve these predetermined parameters, by adjusting the solid-stating time and/or by the use of additives. According to the present invention, the amount of ethylene glycol present during the solid-stating process can be used to control both the rate of change of IV and the rate of transesterification. In particular, it has been found that adding an increasing amount of ethylene glycol to the blend prior to solid stating results in a copolymer having a higher level of transesterification. This result is surprising since conventional wisdom indicates that adding ethylene glycol to the reaction mixture would result in a decrease in the level of transesterification of the resulting copolymer.

More particularly, it is desirable to add PEN to a PET polymer in order to increase the thermal performance, i.e., $T_g$. However, at PEN levels on the order of 20–80 weight percent in a random copolymer (see FIGS. 1–2), the blend is substantially amorphous, which means the material cannot be crystallized. Generally, a crystallizable material is required in a stretch blow-molded article because it provides the necessary levels of orientation and barrier properties, and controls the material distribution. Also, with PET/PEN blends, there is a problem with incompatible phases rendering the article opaque.

Generally, too low a level of transesterification provides a PEN/PET preform of poor clarity (i.e., not substantially transparent), while too high a level of transesterification prevents crystallinity (i.e., strain-induced crystallization and the resulting improved mechanical properties). Thus, in certain applications there is some intermediate level of transesterification desired in order to obtain both substantial transparency and good mechanical properties. The specific level of transesterification required will vary with the relative amounts of the polymers, their IV's, layer thicknesses, use temperature, use of copolymers, etc.

In other applications, the PEN/PET blend may have a relatively high level of transesterification. The copolymers of the present invention having a transesterification of greater than about 30% demonstrate properties similar to copolymers having a transesterification level of about 100% (i.e., truly random copolymers). Thus, a relatively high level of transesterification as used herein refers to a copolymer having a transesterification level of greater than about 30%, and more preferably greater than about 35%. As known to those skilled in the art, the actual level of transesterification at which a copolymer demonstrates the properties of a truly random copolymer depends on a variety of parameters.

Figure 2:
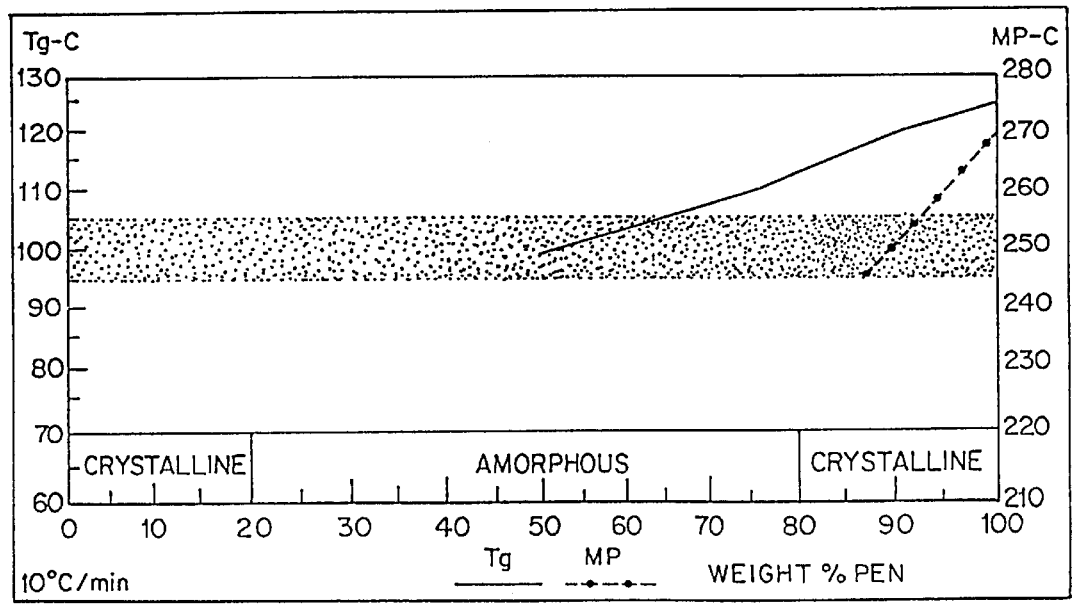

FIGS. 1–2 illustrate graphically the change in melt temperature (MP) and orientation temperature ($T_g$) for PET/PEN near random copolymer compositions, as the weight percent of PEN increases from 0 to 100. There are three classes of PET/PEN compositions: (a) a high-PEN concentration having on the order of 80–100% PEN and 0–20% PET by total weight of the composition, which is a strain-hardenable (orientable) and crystallizable material; (b) a mid-PEN concentration having on the order of 20–80% PEN and 80–20% PET, which is an amorphous non-crystallizable material that, when at a relatively high level of transesterification, will not undergo strain hardening; and (c) a low-PEN concentration having on the order of 1–20% PEN and 80–99% PET, which is a crystallizable and strain-hardenable material. A particular PEN/PET composition can be selected from FIGS. 1–2 based on the particular application.

The PEN and PET polymers useful in the blends of this invention are readily prepared using typical polyester polycondensation reaction conditions known in the art. They can be made by either a batch or continuous process to a desired IV value. Examples of methods which may be employed to prepare the PET and PEN polymers useful in the present invention are found in U.S. Pat. No. 4,617,373.

For example, polyethylene naphthalate (PEN) is a polyester produced when dimethyl 2,6-naphthalene dicarboxylate (NDC) is reacted with ethylene glycol. The PEN polymer comprises repeating units of ethylene 2,6 naphthalate. PEN resin is available having an inherent viscosity of 0.67 dl/g and a molecular weight of about 20,000 from Eastman Chemical Co., Kingsport, Tenn. PEN has a glass transition temperature $T_g$ of about 123° C., and a melting temperature MP of about 267° C.

Either or both of the PET and PEN polymers may optionally be modified with various materials such as dicarboxylic acids, glycols, cyclohexanes, xylenes and bases appropriate for amide formation. Such modifying materials are typically precompounded with the PET or PEN. Thus, as used herein PET and PEN are meant to include such modified polymers.

When dicarboxylic acids are used as the modifying materials, the PEN or PET should include up to 15 mol %, and preferably up to 10 mol %, of one or more of the dicarboxylic acids (i.e., different than naphthalenedicarboxylic acid isomer(s) in the case of PEN and different than terephthalic acid isomer(s) in the case of PET) containing 2 to 36 carbon atoms, and/or one or more different glycols (i.e., different than ethylene glycol) containing 2 to 12 carbon atoms.

Typical modifying dicarboxylic acids for PEN include terephthalic, isophthalic, adipic, glutaric, azelaic, sebacic, fumaric and stilbenedicarboxylic acid and the like. Typical examples of a modifying glycol for PEN include 1,4-butanediol, 1,6-hexanediol, 2,2-dimethyl-1,3-propanediol, 1,4-cyclohexanedimethanol, and the like. The PEN polymers are preferably derived from 2,6-naphthalenedicarboxylic acid, but may be derived from 2,6-naphthalenedicarboxylic acid and also contain, optionally, up to about 25 mol % (preferably up to 15 mol %, more preferably up to 10 mol %) of one or more residues of different naphthalenedicarboxylic acid isomers such as the 1,2-, 1,3-, 1,4-, 1,5-, 1,6-, 1,7-, 1,8-, 2,3-, 2,4-, 2,5-, 2,7- or 2,8-isomers. PEN polymers based primarily on 1,4-, 1,5-, or 2,7-naphthalenedicarboxylic acid are also useful.

Typical glycols used for modifying PEN include but are not limited to alkylene glycols, such as ethylene glycol, propylene glycol, butylene glycol, pentylene glycol, 1,6-hexanediol, and 2,2-dimethyl-1,3-propanediol.

Cyclohexane modifiers appropriate for use with PEN are nonaromatic 6-member ring compounds which can act as base portions in condensation reactions. Such compounds include, for example, 1,4-cyclohexane dimethanol (CAS #105-08-8, available from Aldrich Chemicals, Milwaukee, Wis., USA). Xylenes appropriate for modifying PEN are benzene-containing compounds which include at least one methyl group bonded to the benzene ring and which may have additional alkyl groups bonded to the benzene ring. Such xylenes include, for example, toluene, xylene, methylethylbenzene, methylpropylbenzene and methylbutylbenzene.

PEN modifying amide-forming bases appropriate for use in the present invention include metaxylenediamine (CAS #1477-055-0, available from Aldrich Chemicals), hexamethylenediamine (CAS #124-09-4, available from Aldrich Chemicals), and the like.

Typical modifying dicarboxylic acids for PET include isophthalic acid, adipic acid, glutaric acid, azelaic acid, sebacic acid, fumaric acid, stilbenedicarboxylic acid, biphenyldicarboxylic acid, any of the isomers of naphthalenedicarboxylic acid, and the like. Typical modifying glycols for PET include alkylene glycols, such as ethylene glycol, propylene glycol, butylene glycol, pentylene glycol, 1,6-hexanediol, 2,2-dimethyl-1,3-propanediol, and the like. The aforementioned cyclohexanes, xylenes and amides may also be used to modify PET.

Commercially available "bottle grade" PET includes PET homopolymer and PET copolymers suitable for making containers, which are well-known in the art. These PET copolymers may include a minor proportion, for example up to about 10% by weight, of monomer units which are compatible with the ethylene terephthalate units. For example, the glycol moiety may be replaced by an aliphatic or alicylic glycol such as cyclohexane dimethanol (CHDM). The dicarboxylic acid moiety may be substituted by an aromatic dicarboxylic acid such as isophthalic acid (IPA).

Post-consumer PET (PC-PET) is a type of recycled PET prepared from PET plastic containers and other recyclables that are returned by consumers for a recycling operation, and has now been approved by the FDA for use in certain food containers. PC-PET is known to have a certain level of I.V. (intrinsic viscosity), moisture content, and contaminants. For example, typical PC-PET (having a flake size of one-half inch maximum), has an I.V. average of about 0.073 dl/g to about 0.74 dl/g, a moisture content of less than 0.25%, and the following levels of contaminants:

PVC: <100 ppm
aluminum: <50 ppm
olefin polymers (HDPE, LDPE, PP): <500 ppm
paper and labels: <250 ppm
colored PET: <2000 ppm
other contaminants: <500 ppm PC-PET may be used alone or in one or more layers for reducing the cost or for other benefits.

The amount of PET in the blend (i.e., component (A)) is preferably of from about 50 to about 90 weight %, and more preferably of from about 60 to about 80 weight %. Accordingly, the amount of PEN in the blend (i.e., component (B)) is preferably of from about 10 to about 50 weight %, and more preferably of from about 20 to about 40 weight %.

An amount of ethylene glycol may be used effective to substantially reduce the rate of increase of intrinsic viscosity (molecular weight) during solid stating. The desired overall increase (or decrease) of IV and increase in transesterification can be selected by varying the amount of glycol weight percent, depending upon the particular initial and final IV, transesterification level, and solid-stating time. Typically, the effective amount of ethylene glycol would be at least about 0.05 weight percent, based on the weight of the polymer blend, preferably from about 0.1 to 2%, and more preferably from about 0.1% to 0.5%.

Suitable alkylene glycols have from 2 to 6 carbon atoms; i.e., ethyl $C_2$, propyl $C_3$, butyl $C_4$, pentyl $C_5$, or hexyl $C_6$. Preferred glycols are ethylene glycol ($CH_2OHCH_2OH$) and propylene glycol ($CH_3CHOHCH_2OH$). Particularly preferred is ethylene glycol, $CH_2OHCH_2OH$, a clear, colorless liquid having a specific gravity of 1.1155 (20° C.) and a boiling point of 197.2° C.

The solid-stating procedure which results in transesterification of the PET/PEN blends can be any solid-stating procedure commonly used in the polyester art to increase IV and/or reduce the acetaldehyde concentration. Basically, solid stating is a procedure wherein a solid polymer is heated until the desired level of IV build-up is achieved and a means for removing glycol during heating is provided. However, according to the present invention, the amount of ethylene glycol present is manipulated such that the desired final IV and transesterification level are achieved.

The amount of heating is between the highest glass transition temperature ($T_g$) of the polymers present and the lowest melting temperature (MP) of the polymers present. Typically, the temperature during solid stating is between about 150° C. and about 250° C., preferably between about 210° C. and 250° C., and more preferably between about 215° C. and about 230° C. The amount of IV build-up for typical solid-stating process is an increase of at least about 5%, and preferably at least about 10%. Usually, no more than a 50% increase in IV is desired, although higher build-up is commercially useful for some applications (e.g., tire cord).

The time required for solid stating will vary; at least about 6 hours, and up to about 30 hours, is typical. Preferably, no more than about 24 hours is desired.

Nitrogen flow or vacuum used during the solid-stating process must be strong enough to remove ethylene glycol from the reaction mixture such that the amount of ethylene glycol present in the reaction mixture results in the desired final IV and transesterification level. There are two sources of this ethylene glycol. The first source is the ethylene glycol that is added to the reaction mixture prior to the reaction, and the second source is the ethylene glycol formed as a by-product of the condensation reaction of functional end groups of the polymer chains. It has been found that by adding a specified amount of liquid ethylene glycol prior to the solid stating process, while drawing off ethylene glycol during the reaction, that the IV and transesterification rates can be controlled.

As is readily apparent to a skilled artisan, all parameters for solid stating (such as time, temperature and chemical nature of polymer(s)) are interdependent and will be varied to accommodate a particular desired result.

The compositions of the present invention are suited for high-temperature packaging applications such as hot-fillable, returnable and refillable, and pasteurizable food and beverage containers. The particular overall blend composition desired can be determined by the barrier and thermal properties needed for the end use requirements.

The intrinsic viscosity (IV) affects the processability of the polyester resin. Polyethylene terephthalate having an intrinsic viscosity of about 0.8 is widely used in the carbonated soft drink industry. Resins for various applications may range from about 0.6 to about 1.2, and more particularly from about 0.65 to about 0.85. 0.6 corresponds approximately to a viscosity average molecular weight of 59,000, and 1.2 to a viscosity average molecular weight of 112,000.

Intrinsic viscosity measurements may be made according to the procedure of ASTM D-2857, by employing 0.0050±0.0002 g/ml of the polymer in a solvent comprising o-chlorophenol (melting point 0° C.), respectively, 30° C. Intrinsic viscosity is given by the following formula:

$$IV = (ln(V_{Soln.}/V_{Sol.}))/C$$

where:

$V_{Soln.}$ is the viscosity of the solution in any units;

$V_{Sol.}$ is the viscosity of the solvent in the same units; and

C is the concentration in grams of polymer per 100 mls of solution.

The I.V.s of PEN and PET polymers before solid stating are typically about 0.5 to about 0.8, and more typically about 0.6 to about 0.7. The IV's of the polymers after solid stating are typically about 0.5 to about 1.0, and more typically about 0.7 to about 0.8.

The preform and blown containers should be substantially transparent. A measure of transparency is the percent haze for transmitted light through the wall ($H_T$) which is given by the following formula:

$$H_T = [Y_d, (Y_d + Y_s)] \times 100$$

where $Y_d$ is the diffuse light transmitted by the specimen, and $Y_S$ is the specular light transmitted by the specimen. The diffuse and specular light transmission values are measured in accordance with ASTM method D1003, using any standard color difference meter such as model D25D3P manufactured by Hunterlab, Inc. A substantially transparent container should have a percent haze (through the wall) of less than about 15%, preferably less than about 10%, and more preferably less than about 5%. A substantially amorphous preform should have a percent haze of no more than about 20%, preferably no more than about 10%, and more preferably no more than about 5%. The preform may be single layer or multilayer and may be made in accordance with the well-known injection mold processes, such as described in U.S. Pat. No. 4,710,118 granted Dec. 1, 1987 to Krishnakumar et al., which is hereby incorporated by reference in its entirety.

The materials, wall thicknesses, preform and bottle contours, may all be varied for a specific end product while still incorporating the substance of this invention. The container may be for pressurized or unpressurized beverages, including beer, juice and milk, or for non-beverage products.

The improved thermal resistance provided by this invention makes it particularly suitable for hot-fill containers. Hot-fill containers typically must withstand elevated temperatures on the order of 180–185° F. (the product filling temperature) and positive internal pressures on the order of 2–5 psi (the filling line pressure) without substantial deformation, i.e., a volume change of no greater than about ±1%. Other factors important in the manufacture of hot-fill containers are described in U.S. Pat. No. 4,863,046 to Collette et al. granted Sep. 5, 1989, which is hereby incorporated by reference in its entirety.

The enhanced thermal resistance of the PEN/PET blends of this invention are also particularly useful as one or more layers of a refillable carbonated beverage container able to withstand numerous refill cycles while maintaining aesthetic and functional features. A test procedure for simulating such a cycle without crack failure and with a ±1.5% maximum volume change is as follows.

Each container is subjected to a typical commercial caustic wash solution prepared with 3.5% sodium hydroxide by weight and tap water. The wash solution is maintained at the desired wash temperature, e.g., 60° C., 65° C., etc. The bottles are submerged uncapped in the wash for 15 minutes to simulate the time/temperature conditions of a commercial bottle wash system. After removal from the wash solution, the bottles are rinsed in tap water and then filled with a carbonated water solution at 4.0±0.2 atmospheres (to simulate the pressure of a carbonated soft drink container), capped and placed in a 38° C. convection oven at 50% relative humidity for 24 hours. This elevated oven temperature is selected to simulate longer commercial storage periods at lower ambient temperatures. Upon removal from the oven, the containers are emptied and again subjected to the same refill cycle, until failure.

A failure is defined as any crack propagating through the bottle wall which results in leakage and pressure loss. The volume change is determined by comparing the volume of liquid the container will hold at room temperature, both before and after each refill cycle.

The container can preferably withstand at least 10 refill cycles, and preferably 20 refill cycles at a wash temperature of at least 60° C. without failure, and with no more than about ±1.5% volume change in total.

For use as a refillable bottle, the bottle preferably has a relatively thick champagne base made in accordance with the prior art refill containers described in Continental PET Technologies, Inc.'s U.S. Pat. Nos. 4,725,464 and 5,066,528, which are hereby incorporated by reference in their entirety. The dome and chime form a thickened base portion having about 3–4 times the thickness of the cylindrical sidewall, and having an average crystallinity of no greater than about 10%. Radially outwardly of the chime, there is a thinner outer base portion of about 50–70% of the thickness of the thickened base portion and increasing in crystallinity up to its junction with the sidewall. The thinner outer base wall provides improved impact resistance. The thickened dome and chime provide improved resistance to caustic cracking.

A preferred planar stretch ratio is 8–12:1 for a cylindrical sidewall of a polyester refill beverage bottle of about 0.5 to 2.0 liters/volume, and more preferably about 9–11:1. The hoop stretch is preferably 3–3.6:1 and the axial stretch 2.4–3:0. This produces a container sidewall with the desired abuse resistance, and a preform sidewall with the desired visual transparency. The sidewall thickness and stretch ratio selected depend on the dimensions of the specific bottle, the internal pressure (e.g., 2 atm for beer, 4 atm for soft drinks) and the processing characteristics of the particular material (as determined for example, by the intrinsic viscosity).

The cylindrical sidewall portion of the container which is blown to the greatest extent has the highest average percent crystallinity, preferably about 25–35%. The tapered shoulder, which is also expanded substantially more than the base, preferably has an average percent crystallinity of 20–30%. In contrast, the substantially thickened and lesser blown base has a crystallinity of about 0–10% in the dome and chime, and increases in crystallinity in the outer base moving upwardly towards the sidewall. The neck finish is not expanded and remains substantially amorphous at 0–2% crystallinity.

Various levels of crystallinity can be achieved by a combination of expansion (strain-induced) and heat-setting (thermal-induced).

Methods of making a full-length sleeve and/or separate neck finish portion according to the examples shown in FIGS. 3–6 are described in copending and commonly owned U.S. Ser. No. 08/534,126 filed Sep. 26, 1995, entitled "PREFORM AND CONTAINER WITH CRYSTALLIZED NECK FINISH AND METHOD OF MAKING THE SAME," by Wayne N. Collette and Suppayan M. Krishnakumar, which in turn is a continuation-in-part of copending and commonly owned U.S. Ser. No. 08/499,570 filed Jul. 7, 1995, entitled "APPARATUS AND METHOD FOR MAKING MULTILAYER PREFORMS," by Suppayan M. Krishnakumar and Wayne N. Collette, both of which are hereby incorporated by reference in their entirety.

Figure 3:
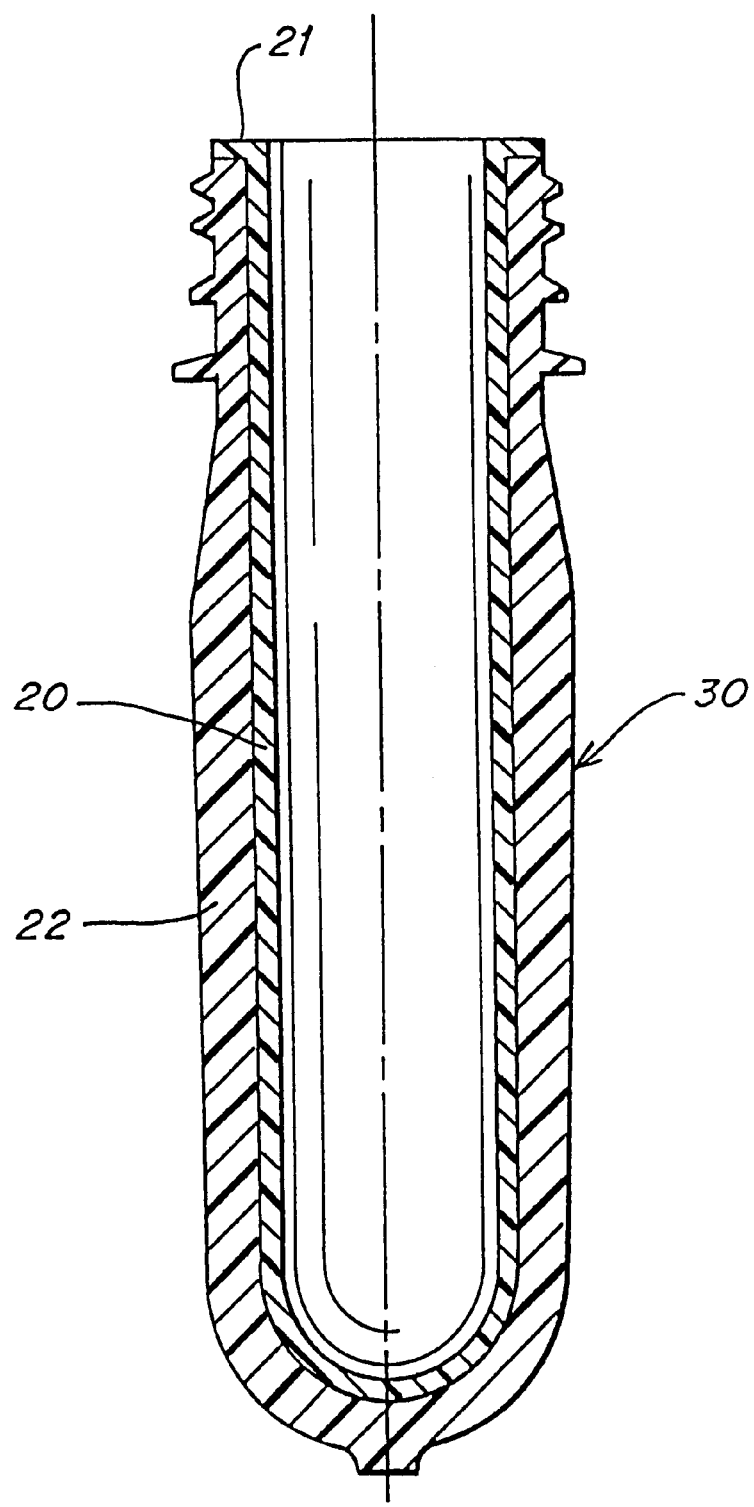
FIG. 3 is a cross-sectional view of a preform embodiment of the present invention having a full-length inner body sleeve of the PEN/PET blend.

FIG. 3 shows a preform 30 which includes an outer layer 22 and a full-length inner sleeve layer 20, the sleeve having a portion 21 extending over the top sealing surface of the neck finish.

Figures 4A, 4B:
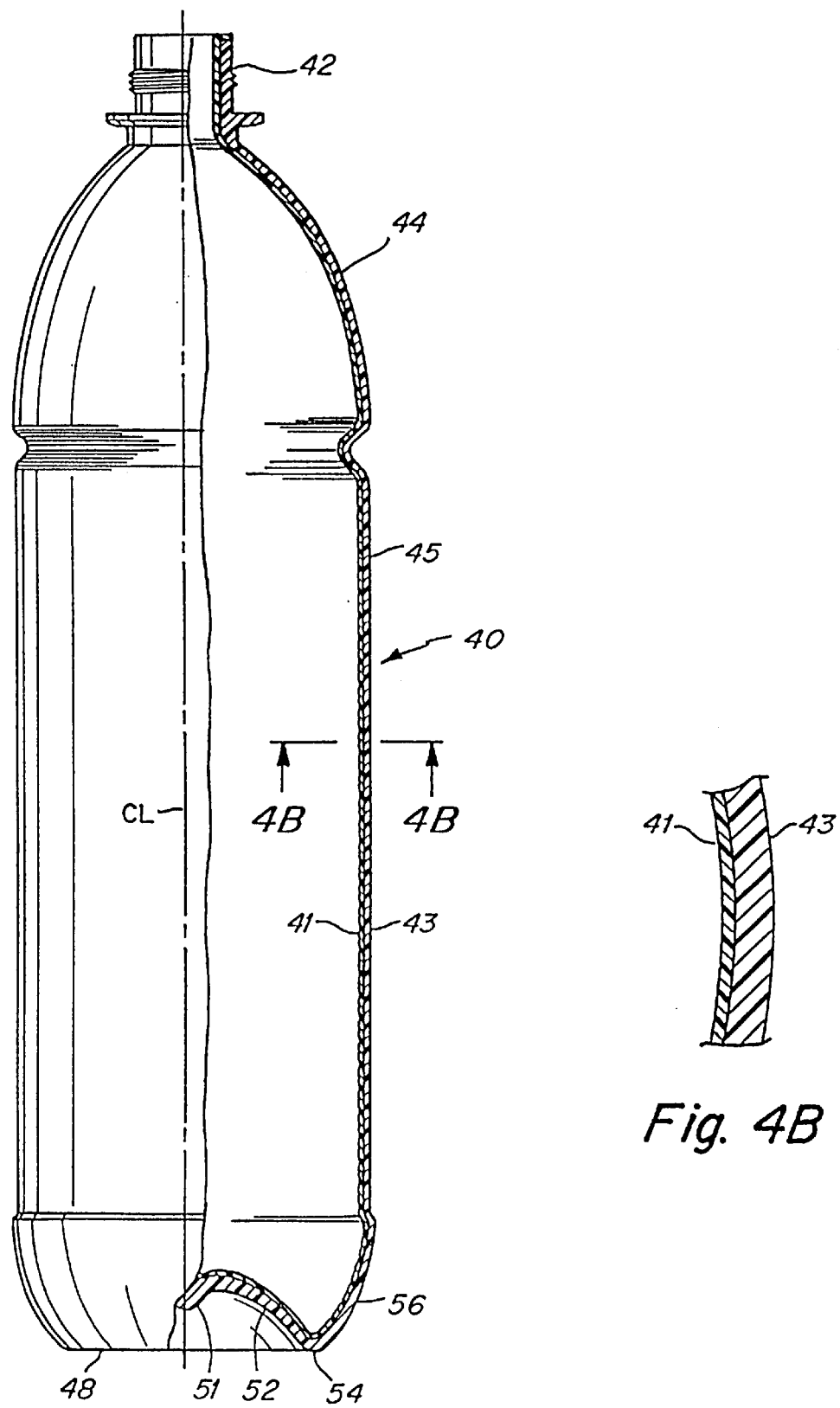
FIG. 4A is a front elevational view of a returnable and refillable carbonated beverage container, partially in section, made from the preform of FIG. 3.
FIG. 4B is an enlarged fragmentary cross-section of the container sidewall taken along the line 4B—4B of FIG. 4A.

FIGS. 4A–4B illustrate a refillable carbonated beverage container, which has been stretch blow molded from the preform of FIG. 3. The multilayer container 40 includes in cross-section a biaxially-expanded inner layer 41 formed from the preform inner sleeve layer 20, and biaxially-expanded outer layer 43 (formed from preform outer layer 22). The container includes an upper neck finish 42 (same as in the preform), a dome-shaped shoulder section 44, a cylindrical panel section 45, and a base 48. The base includes a recessed central dome 52, surrounding a central gate 51, a standing ring or chime 54 surrounding the dome, and an outermost base region 56 connecting the chime to the sidewall. FIG. 4B is an expanded view of the multilayer panel section 45, showing a relatively thin inner layer 41 and relatively thicker outer layer 43. The PEN/PET blend of the present invention may be used as either the inner or outer layers, with the other layer being PET or another compatible polymer. As a cost savings to minimize the use of PEN, the inner layer 41 may be the PEN/PET blend.

Figure 5A:
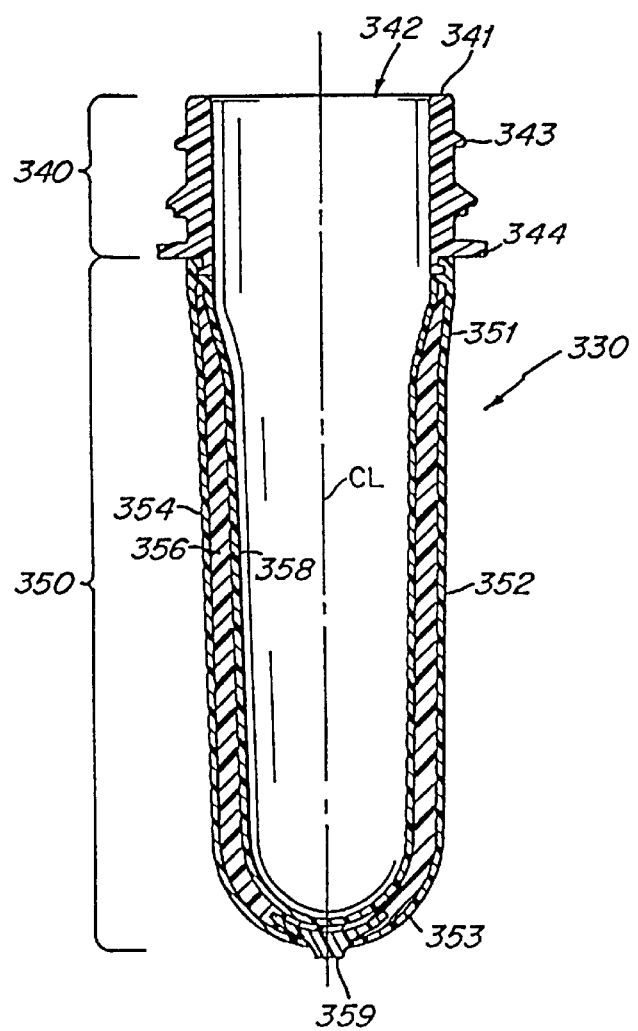
FIG. 5A is a cross-sectional view of another preform embodiment of the present invention having a monolayer neck finish insert and a multilayer body portion.
Figure 5B:
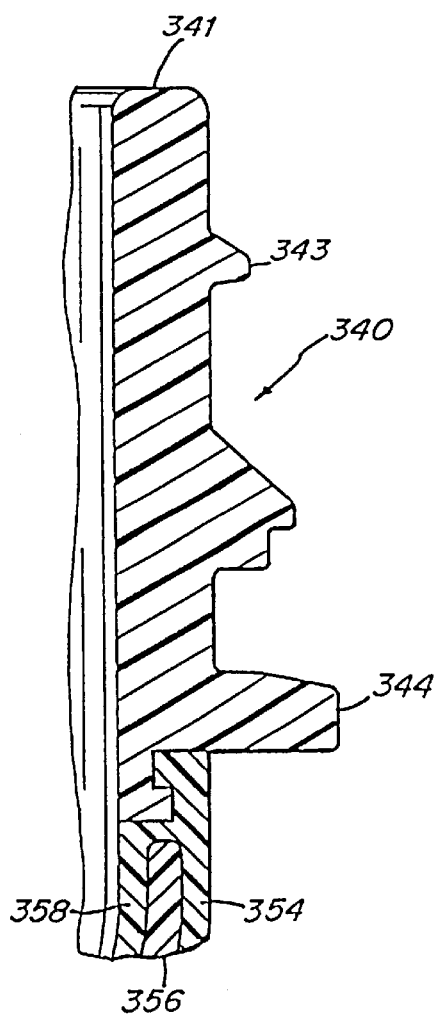
FIG. 5B is an enlarged fragementary cross section view of the neck finish/body junction of the preform of FIG. 5A.

FIGS. 5A–5B illustrate another preform embodiment. In this case, a monolayer neck finish is made of the PEN/PET blend, to provide thermal resistance. This is particularly useful in hot-fillable containers. A multilayer body portion may include one or more layers of PET, PC/PET, a PET/PEN blend of the present invention, or other compatible polymers. The container 330 includes a neck finish portion 340 and body portion 350. The neck finish includes an open upper end 342 including a top sealing surface 341, external threads 343, and a lowermost flange 344. The body portion 350 includes an upper tapered portion 351, which will form the shoulder portion of the container, a cylindrical body portion 352, which will form the panel of the container, and a lower base-forming portion 353. In this example, the body portion includes outer layer 354, core layer 356, and inner layer 358. In the central base portion there is a further layer 359 which is generally made to clear the nozzle of the core material, in preparation for the next injection molding cycle.

The following examples illustrate the invention, but should not be interpreted as a limitation thereon.

EXAMPLE 1

PET/PEN 33.7 lbs of clean post-consumer PET flake, with an average IV of 0.74, and 16.3 lbs of pellets of a homopolymer PEN, with an IV of 0.67, are hand blended and dried at 300° F. using a D-100 desiccant dryer from Conair for a period of 8–10 hours at a dew point of −40° F. or lower. The 50-lb dried blend is then compounded on a 1½" extruder with a 36:1 L/D ratio and a compression ratio of 3:1. The entire transition zone is of a barrier design with a 0.010" clearance between the screw and barrel. The output of the extruder is directed into a stranding dye; molten strands are then pulled through a water bath for cooling, and are finally chopped into ¼" long by _" diameter pellets with a final IV of 0.68.

These pellets are then dried in vacuum with agitation at 250° F. for 3 hours; they are then crystallized under vacuum with agitation at 350° F. for an additional hour before solid stating at 430° F. under high vacuum and agitation for a period of 24 hours in a Ross, Hauppauge N.Y., VB-001 Double Planetary Mixer. Processing of these materials under these conditions yielded a transesterification level of 20%. The 24 hours of solid stating at an IV rate increase of 0.012/hr yielded pellets with an unacceptably high IV of 0.97. Although the 20% transesterification rate targeted in this example was achieved, and the time of solid state processing was reasonable, the final IV was too high to be used for commercial production of stretch-blow molded bottles.

EXAMPLE 2

PET/PEN with 1% Ultranox 626

The same compounding steps as in Example 1 were conducted, but to the 50-lb dried blend was added 1% (by weight) Ultranox 626 (Eastman's phosphite stabilizer) and blended by hand. The pellet IV was 0.69. The pellets were then dried, crystallized and solid stated as in Example 1, but the solid-stating time was 36 hours. The transesterification rate was 0.29/hour, and final transesterification level 10.5%. The 36 hours of solid stating at an IV rate increase of 0.021/hr, yielded pellets with an unacceptably high IV of well over 1.1. Thus, not only was the transesterification level below target, but the IV was too high to produce bottles. Also, the 36 hours of processing time was somewhat excessive and not generally suitable for a commercial process.

EXAMPLE 3

PET/PEN with 0.5% Ethylene Glycol

The same compounding steps as in Example 1 were conducted but to the 50-lb dried blend was added 0.5% (by weight) liquid ethylene glycol and mixed by hand in a bucket. The pellet IV was 0.50.

The pellets were dried, crystallized and solid stated as in Example 1, but the solid-stating time was 11 hours. The final transesterification level was 20%. The 11 hours of solid stating at an IV rate increase of 0.0056/hr yielded pellets with an IV of 0.55. Although a targeted 20% transesterification level was achieved, and the solid-stating time was acceptable, the resultant IV was too low to be used for commercial production of stretch-blow molded bottles.

EXAMPLE 4

PET/PEN with 0.13% Ethylene Glycol

The same compounding steps as in Example 1 were conducted but to the 50-lb dried blend was added 0.13% (by weight) liquid ethylene glycol. The pellet IV was 0.54.

The pellets were dried, crystallized and solid stated as in Example 1, but the solid stating time was 21 hours. The final transesterification level was 20%. The 21 hours of solid stating at an IV rate increase of 0.010/hr yielded pellets with an IV of 0.76. A targeted 20% transesterification level was achieved, the 0.76 IV was acceptable, and the solid-stating time was acceptable for commercial production of stretch-blow molded bottles. This example shows how adjusting the amount of ethylene glycol and solid-stating time provided the desired final IV and transesterification level.

EXAMPLE 5

Preform with PEN/PET Neck Finish

A preform utilizing a PEN/PET blend for the neck finish as shown in FIGS. 5A–5B was produced as follows.

35 pounds of virgin PET pellets, with an average IV of 0.80, and 15 pounds of homopolymer PEN pellets, with an average IV of 0.60, were hand blended and dried as in Example 1. In a polyethylene bucket, 0.3% ethylene glycol was added to the blend by hand. The mixture was compounded as in Example 1. The pellet IV was 0.59.

The pellets were dried, crystallized and solid stated as in Example 1, but the solid-stating time was 26 hours. The final transesterification level was 35%; the IV rate increase was 0.0082/hr to provide a final IV of 0.80.

The state of the material as it came out of the reactor was highly crystalline, which allows for standard, PET drying and processing methods to be used. However, when this material is later melted (during injection molding to form a preform), it does not recrystallize, but, rather, remains amorphous. The material's relatively high $T_g$ of 92° C. allows it to withstand hot filling and pasteurizing temperatures when incorporated into a preform neck finish. The comparatively high transesterification level provides a material which is melt compatible and generally adhering to adjacent layers of PET (i.e., resisting delamination under normal use conditions).

The preform neck finish (as in FIG. 5A) may be produced on one injection molding machine, removed and placed within a second injection molding machine where the body portion is overmolded. Alternatively, both the body and the finish of the preform can be made by different processing steps within the same injection molding machine. The relatively high level of transesterification in the neck finish of this example is acceptable because it is not required to undergo strain oriented crystallization.

EXAMPLE 6

Gaseous Ethylene Glycol Added to Reactor

A theoretical example of a method of introducing ethylene glycol to control transesterification rate and IV increase rate is as follows.

33.7 lbs. of clean post-consumer PET flake, with an average IV of 0.74, and 16.3 lbs. of pellets of homopolymer PEN, with an IV of 0.67, are hand blended and dried at 300° F. using a D-100 desiccant dryer from Conair for a period of 8–10 hours at a dew point of −40° F. or lower. The 50-lb dried blend is then compounded on a 1½ extruder with a 36:1 L/D ratio and a compression ratio of 3:1. The entire transition zone is of a barrier design with a 0.010" clearance between the screw and barrel. The output of the extruder is directed into a stranding dye; molten strands are pulled through a water bath for cooling, and are finally chopped into ¼" long by ⅛" diameter pellets with a final IV of 0.68.

These pellets are then dried in vacuum with agitation at 250° F. for 3 hours in a 1 cubic foot jacketed and agitated vacuum reactor; they are then crystallized under vacuum with agitation at 350° F. for an additional hour before raising the temperature to 430° F. and proceeding under high vacuum (2 Torr) and agitation for a period of 2 hours. The connection from the reactor to the vacuum pump is then closed trapping the vacuum within the reactor but stopping the removal of gases from it. 400 grams of ethylene glycol is slowly added to the reactor maintaining temperature and agitation for 4 hours. This is about double the amount of ethylene glycol added in the previous examples and it is expected that at least part of the ethylene glycol will diffuse into the pellets. The vacuum is then restored removing all remaining gaseous ethylene glycol. The reaction is continued under vacuum for an additional 20 hours. The pellets would be expected to have an IV of about 0.80 and a transesterification level of around 20%.

EXAMPLE 7

PET/PEN with Propylene Glycol

As a theoretical example, propylene glycol was substituted for ethylene glycol in the above examples, using the same weight percent (as ethylene glycol). It is expected that some amount of propyl groups will be included in the copolymer backbone, and that the use of propylene glycol instead of ethylene glycol (based on the same relative weight percent) will provide a faster IV increase and slower rate of transesterification.

FIGS. 6–10 and the following table illustrate the processing effects caused by adding ethylene glycol to the solid stating process according to the present invention.

to the invention is the same as the control sample but included in addition 0.5 weight % ethylene glycol. It had an initial IV of 0.4478; after about 16 hours of solid stating the final IV was 0.5429 at an IV rate increase of 0.0056/hour. A third sample (E) according to the invention is the same as the control sample but included in addition 2 weight % ethylene glycol. It had an initial IV of 0.3665; after about 15 hours of solid stating the final IV was 0.3151, at an IV rate decrease of −0.0036/hour. Note that the third sample (E) had an overall negative change (decrease) in IV, i.e., the polymer chains were breaking up at a faster rate than they were combining. As indicated, each of the three samples (C, D, E) according to the invention has a significantly lower IV rate increase than the control sample (B).

As a further distinction, a sample (F) in accordance with the prior art Eastman patent included 67.4 weight % PET and 32.6 weight % PEN, and in addition 1 weight % of Ultranox 626 (the phosphate stabilizer); it had an initial IV of 0.6400 and a final IV of 0.9845 after about 17 hours, for an IV increase rate of 0.021/hour. Again, this is a significantly higher IV rate increase than the three samples (C, D, E) of the present invention.

Figure 6:
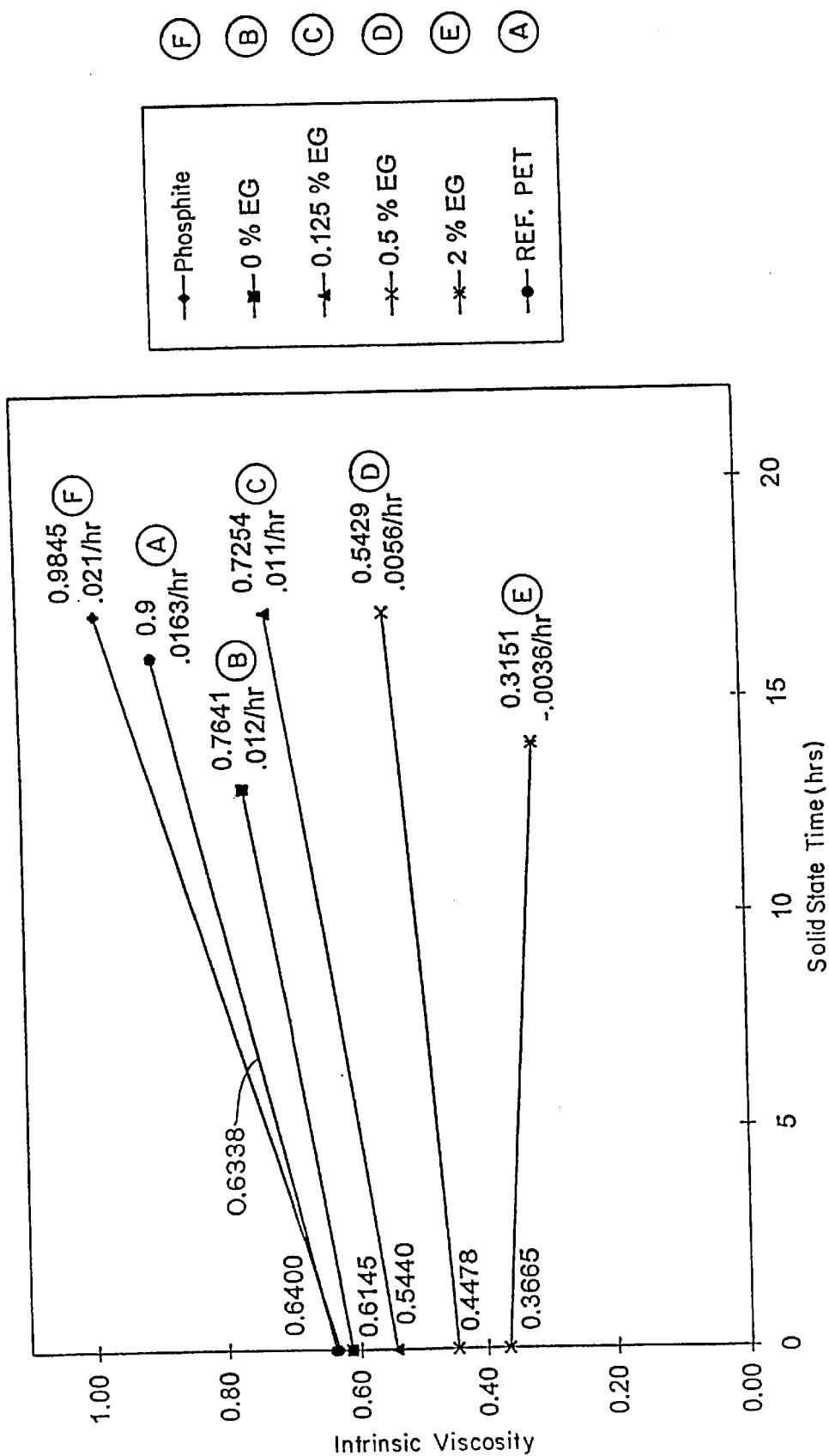
FIG. 6 is a graph of intrinsic viscosity versus solid-stating time illustrating the rate of IV increase for various compositions.
Figure 7:
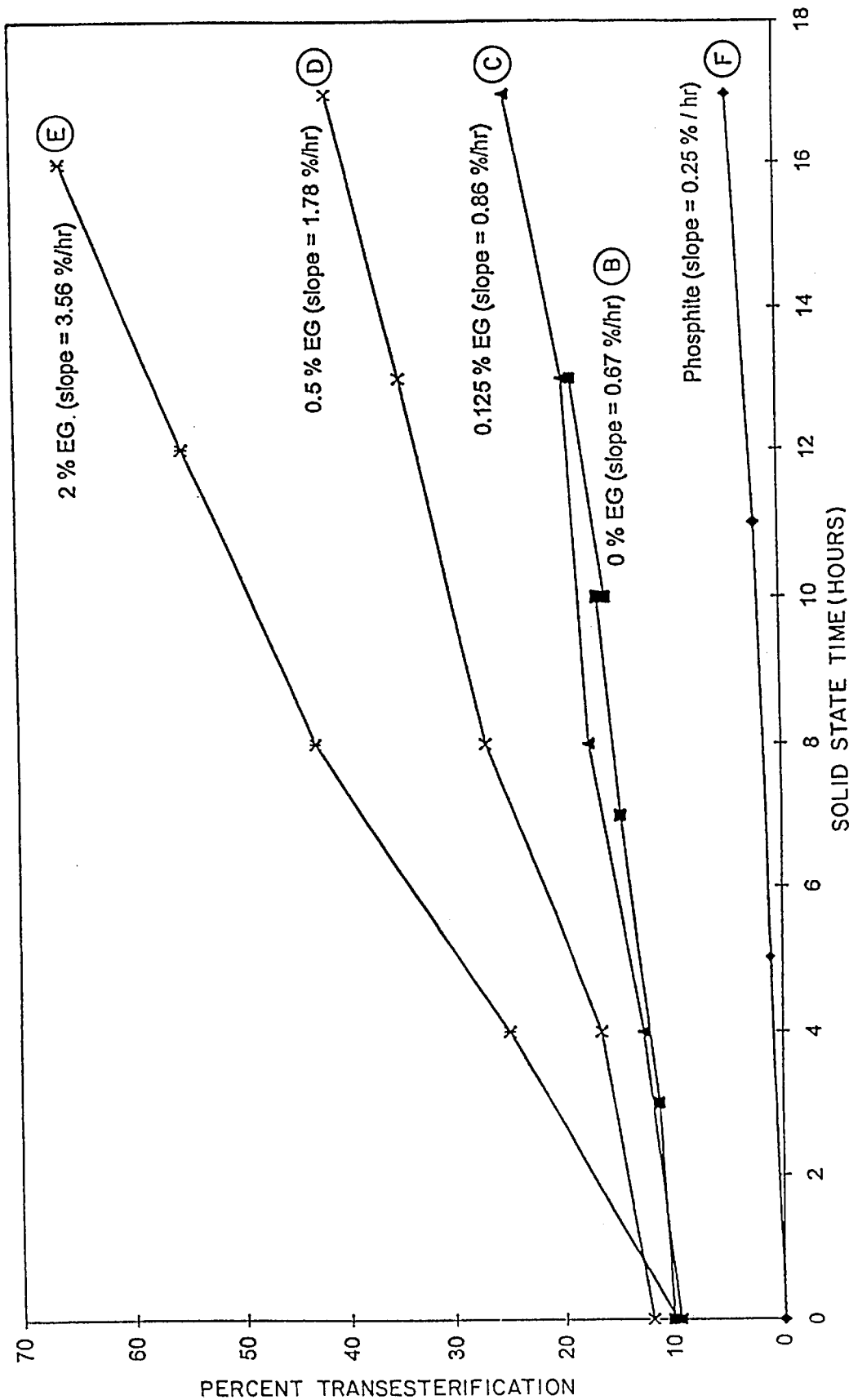
FIG. 7 is a graph of the percent transesterification versus solid-stating time illustrating the rate of transesterification for various compositions.

The percent transesterification for the above copolymers B–F was measured as a function of the amount of ethylene glycol for various solid stating times (FIG. 7). In addition, the initial IV drop, rate of IV gain, and rate of transesterification were also measured. These results are summarized in Table I and shown in FIGS. 6–10.

| Sample | Percent PET | Percent PEN | Percent Phosphite | Percent Ethylene Glycol | Initial IV | Rate of IV Change | Rate of Transesterification |
|---|---|---|---|---|---|---|---|
| A | 100 | 0 | 0 | 0 | 0.6400 | 0.0163 | — |
| B | 67.4 | 32.6 | 0 | 0 | 0.6145 | 0.012 | 0.67 |
| C | 67.4 | 32.6 | 0 | 0.125 | 0.5440 | 0.011 | 0.86 |
| D | 67.4 | 32.6 | 0 | 0.5 | 0.4478 | 0.0056 | 1.78 |
| E | 67.4 | 32.6 | 0 | 2 | 0.3365 | -0.0036 | 3.56 |
| F | 67.4 | 32.6 | 1 | 0 | 0.6338 | 0.021 | 0.25 |

In the graph of FIG. 6, the Y axis is intrinsic viscosity (IV) as determined according to ASTM D/2857 (see prior discussion). On the X axis there is displayed the solid-stating time in hours, from 0 to 20 hours. The compounding and solid-stating conditions were similar to those described in the prior examples. As a reference (A)—see table below—a composition of 100 weight % virgin PET 6307, available from Shell Company (Houston, Tex.), having an initial IV of 0.64 dL/g, was used. After solid stating for about 16 hours, the final IV was 0.9, at an IV rate increase of 0.0163 (dL/g)/hour. As a control sample (B), a composition of 8 molar % dimethyl terephthalate, and 92 weight % dimethyl-2,6-naphthalenedicarboxylate (PEN 15967 available from Eastman Chemical Company, Kingsport, Tenn.), having an initial IV of 0.6338 dL/g, was used. After about 14 hours of solid stating, the final IV was 0.7641, at an IV rate increase of 0.012 (dL/g)/hour.

A first sample (C) according to the invention is the same as the control sample but included in addition 0.125 weight % ethylene glycol. It had an initial IV of 0.5440; after about 17 hours of solid stating, the final IV was 0.7254 at an IV rate increase of 0.011/hour. A second sample (D) according As is clear from Table I, if no ethylene glycol is added to the reaction mixture, the rate of transesterification is relatively low. However, by adding an appropriate amount of ethylene glycol to the reaction mixture, the rate of transesterification is increased dramatically. In particular, by adding 2 weight percent of ethylene glycol to the reaction mixture, the rate of transesterification increases by a factor of more than five relative to a reaction mixture to which no ethylene glycol was added prior to reaction. Thus, adding ethylene glycol to the reaction mixture prior to solid stating allows control of the IV and level of transesterification of the copolymer as well as the solid-stating time.

FIG. 6 demonstrates that the intrinsic viscosity of the copolymer decreases as the amount of ethylene glycol added to the reaction mixture prior to solid stating is increased. Thus, by adding ethylene glycol, the molecular weight of the copolymer is reduced.

FIG. 7 shows that the percent transesterification increases as the amount of ethylene glycol added to the reaction mixture prior to solid stating is increased. This is an unexpected result since the conventional wisdom indicates that adding ethylene glycol should reduce the level of transesterification of the copolymer.

Figure 8:
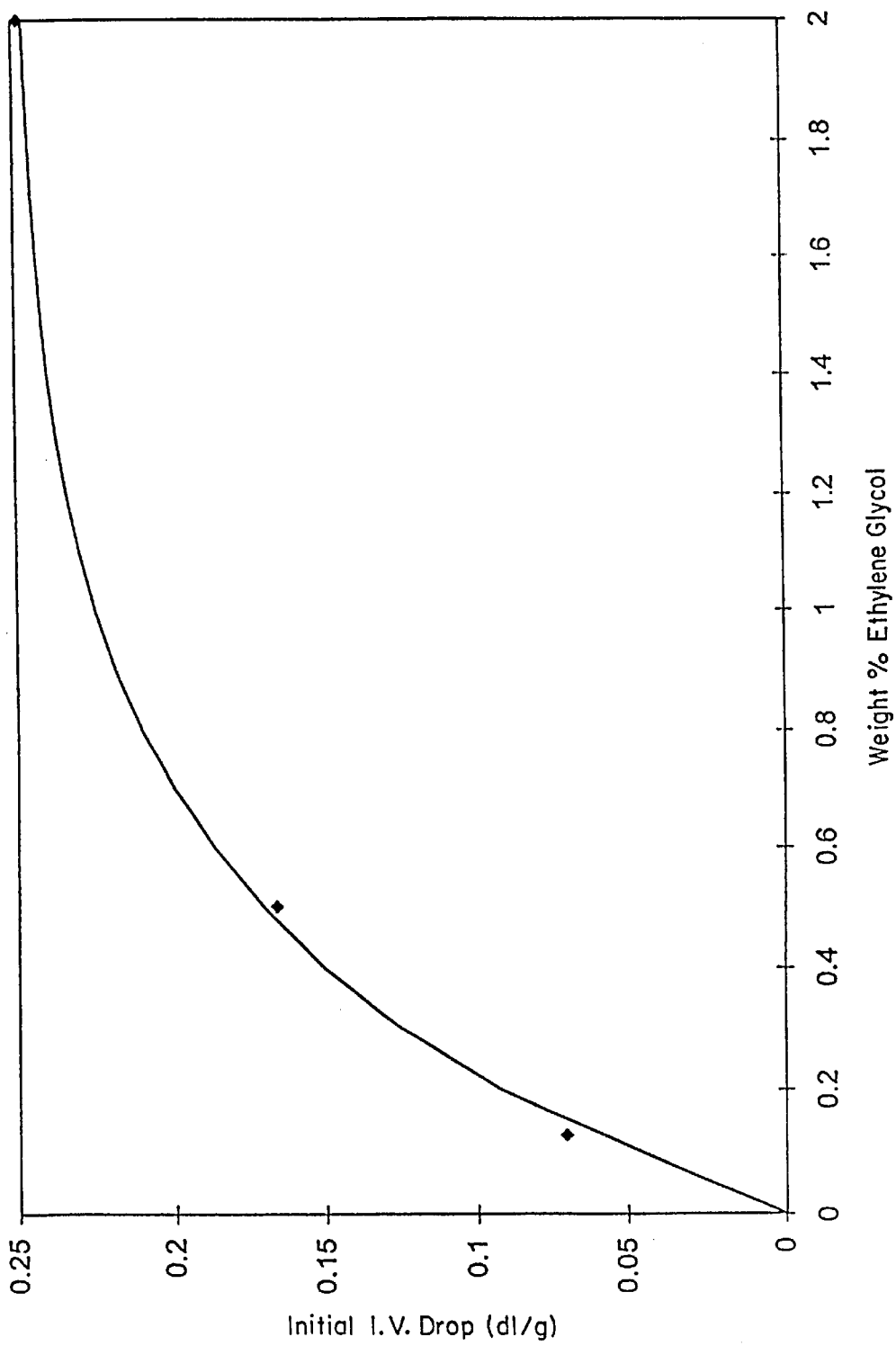
FIG. 8 is a graph of the initial drop in intrinsic viscosity as a function of the weight percentage of ethylene glycol added to the reaction mixture prior to solid stating.

FIG. 8 shows that the initial IV drop in the copolymer increases as the weight percentage of ethylene glycol added to the reaction mixture prior to solid stating is increased. Hence, the added ethylene glycol increases the rate at which the molecular weight of the copolymer decreases.

Figure 9:
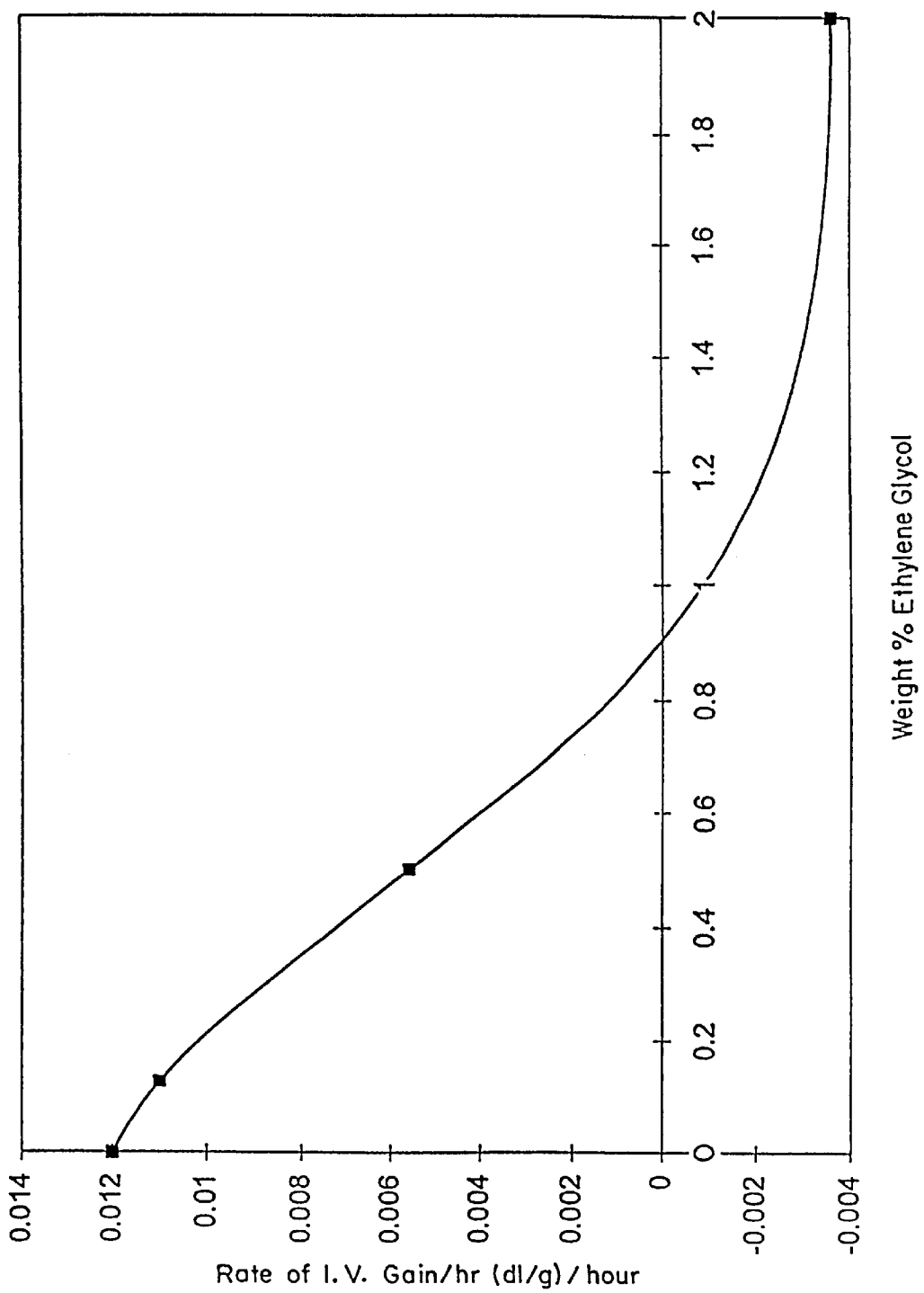
FIG. 9 is a graph of the rate of intrinsic viscosity gain versus the weight percentage of ethylene glycol added to the reaction mixture prior to solid stating.

FIG. 9 shows that the rate of IV gain during solid stating is reduced as the weight percentage of ethylene glycol added to the reaction mixture prior to solid stating is increased. As a result, the added ethylene glycol decreases the rate at which the molecular weight increases.

Figure 10:
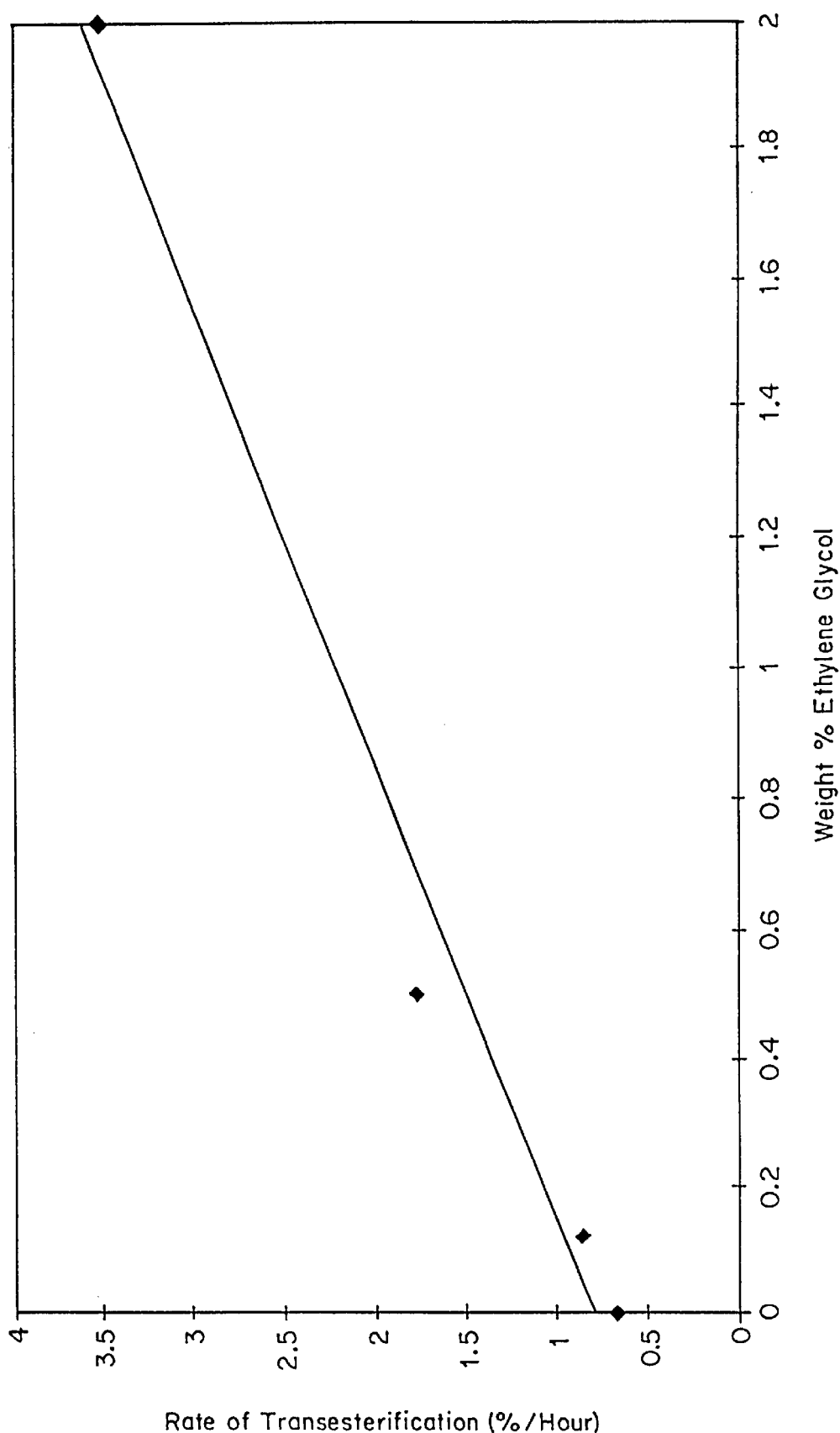
FIG. 10 is a graph of the rate of transesterification as a function of the weight percentage of ethylene glycol added to the reaction mixture prior to solid stating.

FIG. 10 shows that the rate of transesterification increases as the weight percentage of ethylene glycol added to the reaction mixture prior to solid stating is increased. The result is surprising since the conventional wisdom dictates that the presence of this additional ethylene glycol should reduce the rate of transesterification of the copolymer.

Although several preferred embodiments of this invention have been specifically illustrated and described herein, it is to be understood that variations may be made to the method of this invention without parting from the spirit and scope of the invention as defined in the appended claims.

What is claimed is:

1. A method of copolymerising polyethylene naphthale (PEN) and polyethylene (PET) comprising:
   providing PEN;
   providing PET;
   reacting the PEN and PET in the presence of alkylene glycol having up to 6 carbon atoms, to amount of the alkylene glycol being at least 0.05 weight percent based on the total weight of the PEN and PET, to form a copolymerized PEN/PET product.

2. The method of claim 1, wherein the copolymerised PEN/PET product comprises about 60 to 95 weight percent of PET and about 5 to 40 weight percent of PEN.

3. The method of claim 2, wherein the copolymerised PEN/PET product comprises about 35 to 85 weight percent of PET and about 15 to 35 weight percent of PEN.

4. The method of claim 1, wherein the alkylene glycol is selected from the group consisting of propylene glycol and ethylene glycol.

5. The method of claim 4, wherein the alkylene glycol is ethylene glycol.

6. The method of claim 1, wherein the alkylene glycol is compounded with the PEN and PET prior to forming the copolymerised PEN/PET product.

7. The method of claim 1, wherein the alkylene glycol is added to a reaction chamber in which the PEN and PET are copolymerised to form the copolymerised product.

8. The method of claim 1, wherein the effective amount of the alkylene glycol is about 0.1 to 2 weight percent based on the total weight of the PEN and PET.

9. The method of claim 1, wherein the effective amount of alkylene glycol is about 0.1 to 0.5 weight percent based on the total weight of the PEN and PET.

10. The method of claim 1, wherein at least one of PET and PEN is modified with up to about 15 mol percent of one or more different dicarboxylic acids containing from 2 to 36 carbon atoms, one or more different glycols containing from 2 to 12 carbon atoms, or a mixture of the one or more different dicarboxylic acids and the one or more different glycols.

11. The method of claim 1, wherein the reacting step is carried out at a temperature of about 175° C. to 250° C. for at least about 6 hours such that a level of transesterification of the copolymerised PEN/PET product is increased at least about 5%.

12. The method of claim 11, wherein the reacting step is carried out at a temperature of about 215° C. to 240° C. for about 8 to 12 hours such that the level of transesterification of the copolymerised PEN/PET product is increased about 5 to 25%.

13. The method of claim 1, wherein the reacting step is carried out at a temperature of about 175° C. to 250° C.

14. The method of claim 1, wherein an IV of the PET is about 0.70 dL/g to 0.75 dL/g.

15. The method of claim 1, wherein the PET is post-consumer PET (PC-PET).

16. The method of claims 1, wherein the amount of the alkylene glycol reduces the rate of IV increase during the reacting step by at least about 10% as compared to reaction of the PEN and PET in the absence of the alkylene glycol.

17. The method of claim 1, wherein an IV of the PEN/PET product is greater than an IV of the PET.

18. The method of claim 1, wherein the amount of the alkylene glycol is no greater than about 2% by total weight of the PEN and PET.

19. The method of claim 1, wherein a phosphite antioxidant is present in the reacting step for reducing the rate of transesterification during the reacting step.

20. The method of claim 1, wherein the copolymerised PEN/PET product has a level of transesterification greater than about 30%.

21. The method of claim 1, wherein both the amount of alkylene glycol and time of the reacting step are controlled.

22. The method of claim 1, wherein an IV of the PEN is about 0.5 dL/g to about 0.8 dL/g, an IV of the PET is about 0.70 dL/g to about 0.75 dL/g, an IV of the PEN/PET product is at least 5% greater than the IV of the PET, and a level of transesterification of the copolymerized PEN/PET product is greater than about 30%.

23. The method of claim 1, wherein an IV of the PEN is about 0.5 dL/g to about 0.8 dL/g, an IV of the PET is about 0.70 dL/g to about 0.75 dL/g, an IV of the PEN/PET product is at least 5% greater than the IV of the PET, and a level of transesterification of the copolymerized PEN/PET product is increased by about 5 to 25%.

* * * * *

UNITED STATES PATENT AND TRADEMARK OFFICE
CERTIFICATE OF CORRECTION

PATENT NO. : 6,395,865 B2
DATED : May 28, 2002
INVENTOR(S) : Schmidt et al.

It is certified that error appears in the above-identified patent and that said Letters Patent is hereby corrected as shown below:

Title page,
Item [73], Assignee, "Continental Pet Technologies INC," should read -- Continental PET Technologies, Inc., --.

Column 15,
Line 24, "naphthale" should read -- naphthalate --.
Line 25, after "polyethylene", insert -- terephthalate --.
Line 29, "to amount" should read -- the amount --.

Column 16,
Line 25, "claims" should read -- claim --.

Signed and Sealed this

Seventeenth Day of December, 2002

JAMES E. ROGAN
*Director of the United States Patent and Trademark Office*